US009784551B1

(12) United States Patent
Brown

(10) Patent No.: US 9,784,551 B1
(45) Date of Patent: Oct. 10, 2017

(54) CENTERPOINT MARKING TOOL

(71) Applicant: John W. Brown, Harwinton, CT (US)

(72) Inventor: John W. Brown, Harwinton, CT (US)

( * ) Notice: Subject to any disclaimer, the term of this patent is extended or adjusted under 35 U.S.C. 154(b) by 0 days.

(21) Appl. No.: 15/395,380

(22) Filed: Dec. 30, 2016

(51) Int. Cl.
*B25D 5/00* (2006.01)
*G01B 3/00* (2006.01)

(52) U.S. Cl.
CPC ............... *G01B 3/002* (2013.01); *B25D 5/00* (2013.01)

(58) Field of Classification Search
CPC .................................... B25D 5/02; B25D 5/00
USPC ........................ 33/520, 670, 671, 675, 1 CC
See application file for complete search history.

(56) References Cited

U.S. PATENT DOCUMENTS

| | | | | |
|---|---|---|---|---|
| 578,196 | A * | 3/1897 | Beck | B25D 5/02 33/675 |
| 794,170 | A * | 7/1905 | Fessler | B25D 5/02 33/520 |
| 1,187,658 | A * | 6/1916 | Sauerhering | B25D 5/02 33/675 |
| 1,274,647 | A * | 8/1918 | Whipple | B25D 5/02 33/675 |
| 1,373,367 | A | 3/1921 | Summers | |
| 1,539,700 | A * | 5/1925 | Stramaglia | B25D 5/00 33/675 |
| 2,348,878 | A | 5/1944 | Behen | |
| 2,479,912 | A * | 8/1949 | Desy | B25D 5/02 33/520 |
| 2,599,819 | A * | 6/1952 | Fisher | B25D 5/02 33/675 |
| 2,825,143 | A * | 3/1958 | Polivka | B23B 47/28 33/520 |
| 2,842,860 | A * | 7/1958 | Gray | B25H 7/02 101/112 |
| 3,025,609 | A * | 3/1962 | Hendrix | B25H 7/00 33/44 |
| 3,345,755 | A | 10/1967 | Ferebee | |
| 3,628,253 | A * | 12/1971 | Shepard | E04G 21/1841 101/368 |
| 4,084,325 | A | 4/1978 | Jones | |
| 4,981,400 | A * | 1/1991 | Stover | B23B 47/287 33/667 |
| 5,437,105 | A | 8/1995 | Work | |
| 6,158,137 | A | 12/2000 | Bramlett | |
| 6,904,697 | B2 | 6/2005 | Zars | |
| 7,082,694 | B2 | 8/2006 | Lyman, Jr. | |
| 7,421,797 | B1 | 9/2008 | Servin et al. | |

(Continued)

FOREIGN PATENT DOCUMENTS

| | | |
|---|---|---|
| CN | 102589389 A | 7/2012 |
| CN | 103335577 A | 10/2013 |
| CN | 103335577 B | 9/2015 |

*Primary Examiner* — Christopher Fulton
(74) *Attorney, Agent, or Firm* — Damian Wasserbauer; Wasserbauer Law LLC

(57) ABSTRACT

The present invention is a tool for locating and marking center points on various objects configured with a geared carriage assembly having guide holes for insertion of posts and a counterpunch centered automatically when posts are inserted into an interior and/or exterior surface of an object such as a square, rectangular, polygon, circle or other circular shapes. The tool is particularly novel to quickly and accurately locate the center point from a hole, aperture, and/or a prick mark made in the surface of the object such as, for example, paper, sheet metal, etc.

3 Claims, 2 Drawing Sheets

(56) References Cited

U.S. PATENT DOCUMENTS

| | | | | |
|---|---|---|---|---|
| 7,694,427 | B2 | 4/2010 | Long | |
| 8,413,345 | B2 | 4/2013 | Lane | |
| 9,009,983 | B1 * | 4/2015 | Morris | B25H 7/04<br>33/21.1 |

* cited by examiner

100

CENTERPOINT MARKING TOOL

FIELD OF THE INVENTION

The present invention relates to a center locating device for locating the center point of an object and, more particularly, to a versatile, adjustable center point marking tool assembly for ascertaining the center of numerous objects including a workpiece of irregular configuration and markings and openings of a workpiece surface.

BACKGROUND OF THE INVENTION

Numerous tools have been developed to locate the center point of an object. These conventional tools and devices typically locate the center point measuring from an outer edge of a square or circular object. However, such conventional tools have disadvantages and difficulties measuring a center point from points and markings on a surface, between point-to-point and/or two holes in an object. Conventional tools also have disadvantages in measuring from the center point from either the interior or exterior of various shaped objects. Consequently, there is a need for a tool for locating and marking the center point of an object in multiple ways with relative ease and useful in many fields of use and technical fields.

SUMMARY OF THE INVENTION

It is an object of the present invention to provide a center point marking tool device having a pair of carriage assemblies configured in a general block shape adapted to be positioned upon an object, each carriage assembly has arm shafts to secure one end of the arm and to allow extensions and contractions thereof, and a plurality of guide holes formed between the upper and lower block portions therethrough and substantially orthogonal to the object for locating the center thereof. Post members are dimensioned to be slideably received in the plurality of guide holes formed in the carriage assembly. A gear assembly has upper and lower flange portions and a central hub that is secured at the center by a pair of elongated arm members configured for securing one end to in one of the arm shafts, and having a free end slidably mounted within the arm shaft so as to extend beyond the carriage assembly. Each elongated arm member has a rack gear for operably interconnecting the gear assembly to the arm members for simultaneous movement of the free end of an arm through the respective arm shaft. The gear assembly defines a center point for any given position of the arms relative to the carriage assembly with the center point in alignment with the central axis of a bore of the gear assembly and configured to maintain alignment as being movably mounted for free movement by the free end of the arms relative the carriage assembly.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Description of the Embodiments, which is to be read in association with the accompanying drawings, which are incorporated in and constitute a part of this specification, show certain aspects of the subject matter disclosed herein and, together with the description, help explain some of the principles associated with the disclosed implementations, wherein.

DESCRIPTION OF THE EMBODIMENTS

Figure 1:
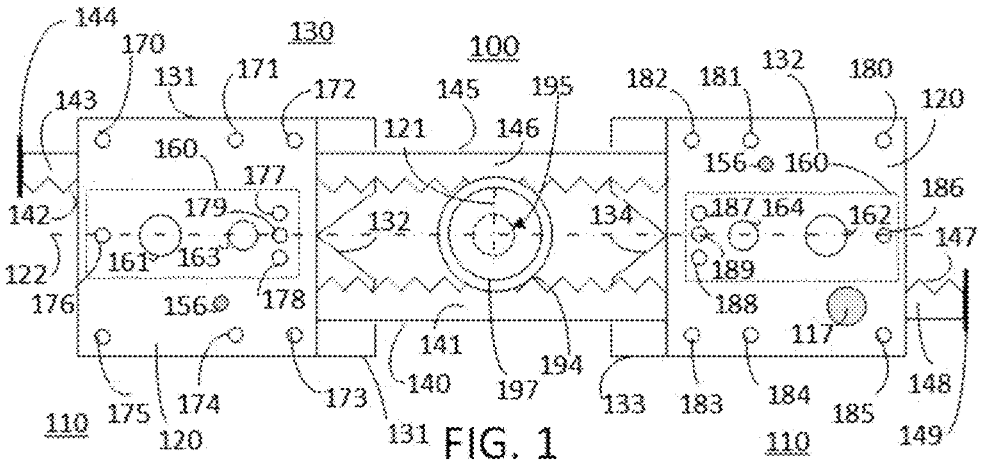
FIG. 1 illustrates a top view of the locating and marking tool in accordance with an embodiment of the present invention.

Non-limiting embodiments of the present invention will be described below with reference to the accompanying drawings, wherein like reference numerals represent like elements throughout. While the invention has been described in detail with respect to the preferred embodiments thereof, it will be appreciated that upon reading and understanding of the foregoing, certain variations to the preferred embodiments will become apparent, which variations are nonetheless within the spirit and scope of the invention.

The terms "a" or "an", as used herein, are defined as one or as more than one. The term "plurality", as used herein, is defined as two or as more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "some embodiments", "one embodiment", "certain embodiments", and "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means any of the following: "A; B; C; A and B; A and C; B and C; A, B and C". An exception to this definition will occur only when a combination of elements, functions, steps or acts are in some way inherently mutually exclusive.

The drawings featured in the figures are provided for the purposes of illustrating some embodiments of the present invention, and are not to be considered as limitation thereto. Term "means" preceding a present participle of an operation indicates a desired function for which there is one or more embodiments, i.e., one or more methods, devices, or apparatuses for achieving the desired function and that one skilled in the art could select from these or their equivalent in view of the disclosure herein and use of the term "means" is not intended to be limiting.

As used herein the term "object" and/or "item" refers to an article, item, or physical thing of different types of materials including an individual item article or unit having three dimensions.

As used herein the term "work" and/or "workpiece" refers to the thing or article operated on, altered, changed, or reduced by a claimed apparatus or method, e.g. the object which is worked on with a machine or tool.

As used herein the term "post" and/or "post member" refers to a long, sturdy piece of wood, plastic or metal that may be of various diameters, gages and/or sizes configured with an edge, surface or point to register with an aperture, hole and/or prick mark.

As used herein the term "punch", "prick punch", "centerpunch" or "center punch" refers to a tool with a conical point for making an indentation in an object, which is usually struck by a hammer e.g. to allow a drill to make a hole at the same spot without slipping and steadies the drill bit when drilling.

Figure 2:
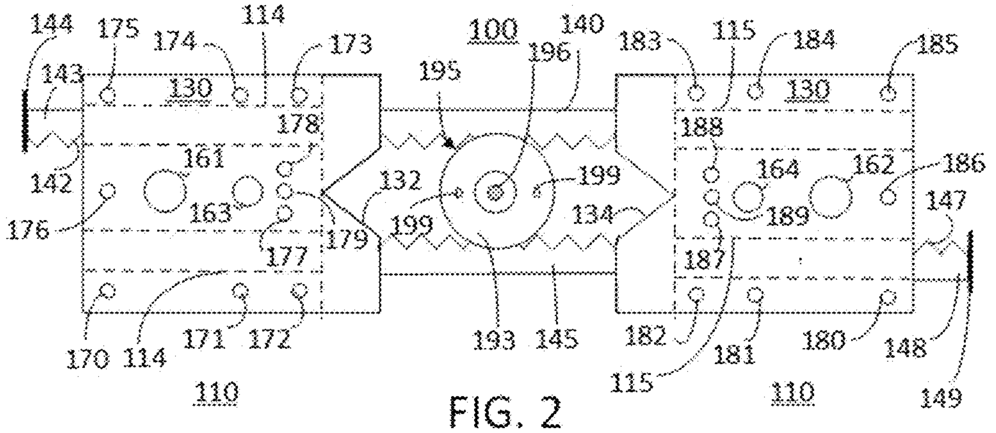
FIG. 2 illustrates a bottom view of the locating and marking tool.
Figure 3:
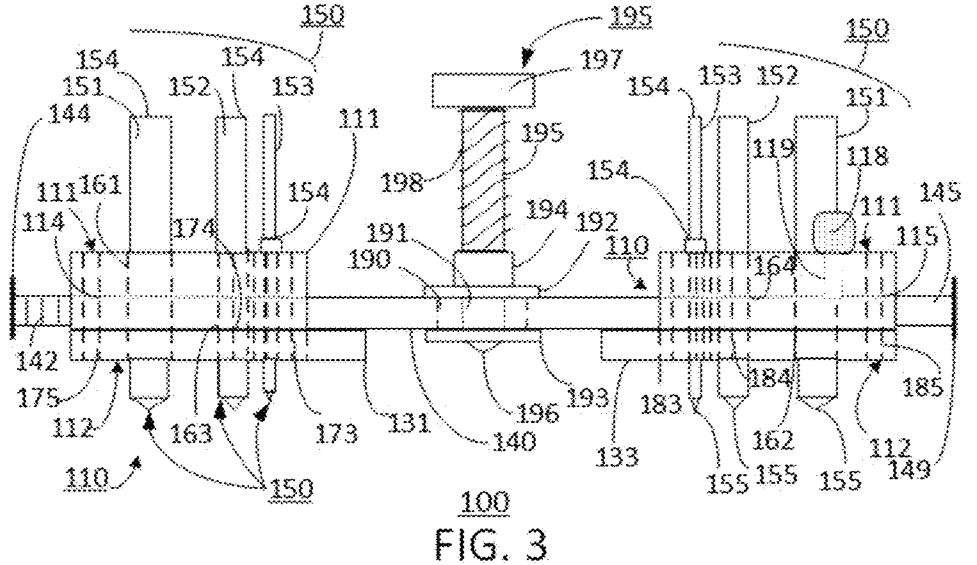
FIG. 3 illustrates a side view of the locating and marking tool.

As illustrated in FIGS. 1-3, a center point marking device 100 is provided according to an embodiment of the present invention. The center point marking device 100 is useful in determining the center point 101 of numerous objects 102 including square 106, rectangle 107, other sided-shapes and/or polygons, circles 108 and other circular shapes such as an ellipse and/or oval 109 using at least two of the post members 150. The commendation tool 100 may be formed using durable materials including metals, metal alloys, carbon fiber and suitable plastics according to an embodiment of the present invention. It should be appreciated to one in the field of machining and tooling that the center point marking device 100 may be formed in different shapes and sizes that may achieve the same functionality according to the embodiments of the present invention.

Referring to FIG. 1, the center point marking tool device 100 is a locating tool assembly configured with a pair of carriage assemblies 110 comprising an upper block 120 and a lower block 130 adapted to join a pair of arms 140 and 145 with a gear 190 disposed at the center point 10 therebetween, as shown in FIG. 3. The upper block 120 may further include a plurality of guide holes 160 configured as large holes 161 and 162, medium holes 163 and 164, and a plurality of smaller holes 170 that are separately identified as individual holes 171 through 190. The carriage assembly 110 is configured with the upper block 120 connected to the lower block 130 that extends beyond the upper block 120 thereby forming extensions 131, 132. The extensions 131, 132 may be formed with a centering point-recess 133, 134, for example, a v-notch having a point-recess 133 formed on an edge of the extension 131 (FIGS. 1 and 2); and similarly, a point-recess 132 that may be formed on an edge, for example, a v-notch formed on extension 134 edge, as shown in FIGS. 1 and 2. In operation, for example, an object 102 may be positioned so as to locate and mark the center point 101 thereof with a counter punch 195, e.g. using each of the point recesses 133, 134, the guide holes 160, 170.

As shown in FIGS. 1-3, the upper block 120 may be formed from extruded metal stock separated into a block shape. The lower block 130 may be formed from metal plate or bars separated into a rectangular shape. The upper and lower blocks 120, 130 may be joined in a strong, durable bond by suitable means such as fasteners (e.g. a cap screw in a counter sunk hole), adhesives, welds, and the like. Upper and lower blocks 120,130 may be formed with one or more guide holes 160 located along the centerline 122 and through the block, e.g. from a top surface 111 to bottom surface 112 of the carriage assembly 100 shown in FIG. 3. Similarly, the plurality of holes 170, (i.e. 171-190 may be formed at various locations adjacent the centerline 122 and edges of the block, each extending between a top surface 111 and a bottom surface 112 of the joined upper and lower blocks 120, 130.

As is illustrated in FIGS. 1-2, according to an embodiment of the present invention, the guide holes 160 may be formed as a pair of large holes 161, 162, formed on the centerline 122 of each of the carriage assemblies 110. The large holes 161, 162 are configured to receive a post 151 of a dimension so as to be slidably received in the large holes 161, 162 functioning to extend along the centerline 122 from the bottom surface 112 of the carriage assembly 110. Post 151 is configured to engage the object 102 to find and mark the center point 101 using an edge, and/or side surface of the end 154, and/or point 155. Similarly, the guide holes 160 may be formed as a pair of medium dimension holes 163, 164, formed on the centerline 122 of each of the carriage assemblies 110. These medium holes 163, 164, are configured to receive a post 152 dimensioned to be slidably received in the medium holes 163, 164 functioning to extend along the centerline 122 so the carriage assemblies 110 may engage varying sized objects 102 by the posts 152 extending from the bottom surface 112 to engage objects 102 of varying sizes. In the same manner, smaller dimensioned holes 176, 179, 186, and 189, are configured to receive a pin post 153 dimensioned to be slidably received in the holes 176, 179, 186, and 189 functioning to extend along the centerline 122 so the carriage assemblies 110 may engage varying sized objects 102. As illustrated in FIGS. 1, 2, and a side view FIG. 3, the plurality of pin-holes 170-175, 177-185, 187, 188, and 190 may be formed adjacent one or more edges of the carriage assembly 110. These holes 170-175, 177-185, 187, 188, and 190 are configured to receive a pin post 153 dimensioned to be slidably received in the pin-holes 170-175, 177-185, 187, 188, and 190 functioning to engage varying sized objects 102 such as, for example, square 106, rectangle 107, circle 108, and an oval and/or ellipse 109 shapes on an interior surface (e.g. tube, frame, circular shaped cut-out, etc.) and/or exterior surface of the object 102. The pin post 153 can be configured with a collar 154 so as to form a stop when locating and marking a center point 101 as well as to store the pin post 153 (inserted in an opposite direction) when not in use.

As illustrated in FIG. 3-6, each of the posts 151, 152 and 153 function to extend from the bottom surface 122 and configured to engage varying sized prick-points, marks, holes, surfaces, interior and exterior edges of objects 102 so as to determine the center point 101. Each of the posts 151, 152 and 153 may be formed as an elongated, rounded dowel form suitable materials such as metals, metal alloys and/or other strong and durable materials. One end of the posts 151, 152, and 153 may be formed as an orthogonal, flat surface 154 configured to engage varying holes, surfaces, interior and exterior edges of objects 102 so as to determine the center point 101. The other end of the posts 151, 152, and 153 may be formed as a point 155 can be configured as a round function to extend from the bottom surface 122 and configured to engage varying sized prick-points, marks, holes, surfaces, interior and exterior edges of objects 102 so as to determine the center point 101.

As shown in FIGS. 2 and 3, each carriage assembly 110 may be formed with arm shaft openings 114, 115 configured to slidably receive one end of the arms 140 and 145 so as to compress and expand to extend the guide posts 160, 170 for an object 102 with a free end 142, 148 of the arms 140, 145 sliding in the arm shaft openings 114, 115. An arm lock assembly 117 may be provided on one or more of the carriage assemblies 110 to lock the position of the arms 140, 145. On the other end of the arms 140, 145 the carriage assembly 110 may be configured to receive the other end of each of the arms 140, 145 disposed in the arm shaft openings 114, 115 and secure by a fastener 156 the arms 140, 145 therein, respectively, as shown in FIG. 1, such as, for example, using a set screw, press fitting, spot welds, and other fastening techniques. The arms 140, 145 may be formed from an elongated member 141, 146 having a gear toothed surface portion 142, 147, respectively, on the one edge thereof. The gear toothed surface portion 142, 147 may be configured to match the group ratio of the gear assembly 190, and may be formed from suitable metals, metal alloys, and/or composite materials of suitable strength and milled using machining and/or milling manufacturing techniques.

As shown in FIGS. 1 and 3, the arm lock assembly 117 may be formed from a knob 118 and threaded post 119 disposed in a hole formed adjacent one or more of the arms 140, 146. Thus, when arm locking assembly 117 is rotated in a direction to move it downwardly, the lower surface thereof will abut one of the arms 140, 145, for example, as illustrated in FIG. 1, a hole formed adjacent the arm 145 so as to urge the lower end of the threaded post 119 downwardly against the contacted arm 145, simultaneously locking all of the arms 140, 145 against movement of the carriages 110 due to the interconnection with the gear assembly 190 and geared portions 142, 147. When knob 118 is rotated in the opposite direction and thus moved upwardly out of contact with arm 145, the arms 140, 145 will exert no locking force there-against. It is contemplated that the desired rotational movement of both knob 118 and threaded post 119 will be achieved manually, and to assist in this regard the outer surfaces of the knob 118 may be knurled or otherwise suitably roughened.

As shown in FIGS. 2 and 3, the gear assembly 190 can be configured with a centerline hole 191 and flange portions 192, 193 that may be secured together by a fastener such as, for example, one or more set pins. The centerline hole 191 is configured to receive a center punch 195 there-through. A collar stop 194 may be secured to the flange portions 192 to provide a stop for the spring 198, for example, to drive the tip 196 into the object 102, e.g. by hammering on a head 197 of the center punch 195 to drive the tip 196 into the object 102. The tip 196 may be formed from suitable materials that withstand impacts such as, for example, hardened steel. The spring 198 is configured to recoil the center punch 195 and is disposed over the center punch 195 and between the collar stop 194 and the head 197. In operation, the gear assembly 190 is operably coupled to gear tooth portions 142, 147 on arms 140, 145, respectively, so as to allow slidably movement and expansion and/or compression of the carriage assemblies 110 while maintaining its position at the center 121 and along the centerline 122, as shown in FIG. 1.

Figure 4:
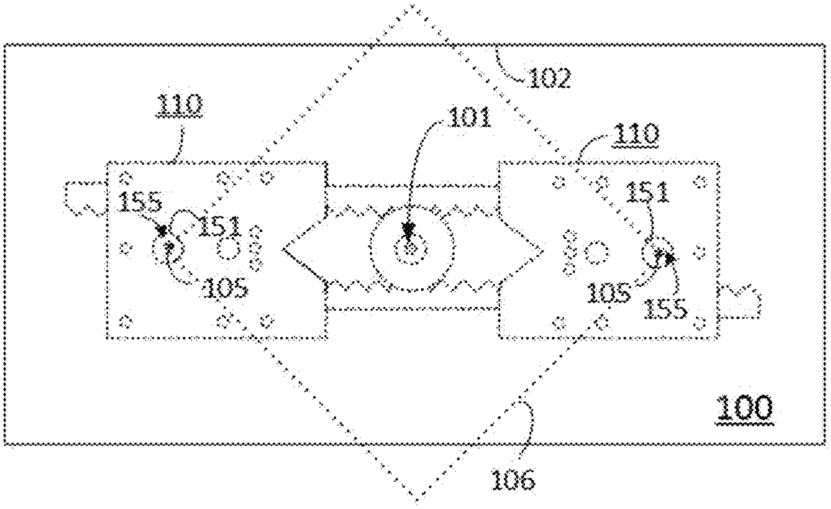
FIG. 4 illustrates a bottom view of for the operation of the locating and marking tool.
Figure 5:
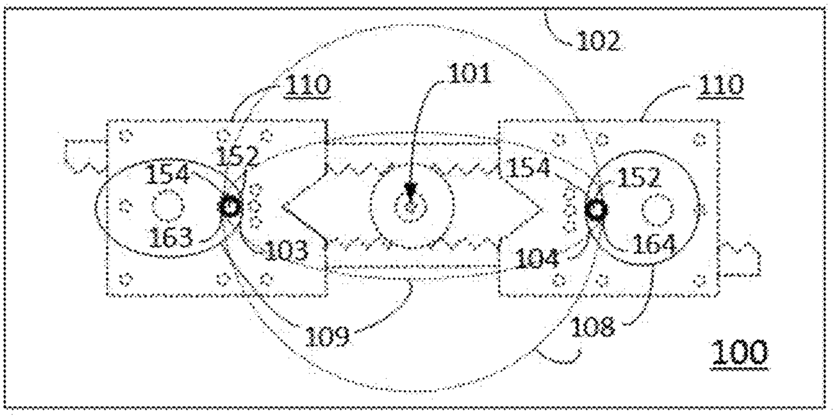
FIG. 5 illustrates a bottom view of for the operation of the locating and marking tool.
Figure 6:
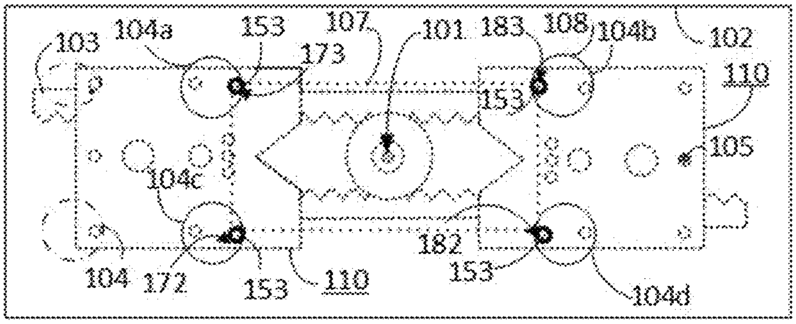
FIG. 6 illustrates a bottom view of for the operation of the locating and marking tool.

Referring to FIGS. 4 through 6, according to embodiments of the present invention, the center point marking device 100 may be used to locate the center 121 of an object 102 (e.g. bar or rod of a square 106, rectangle 107, circle 108, or other circular shape oval 109), and mark a center point 101. The center point marking device 100 is shown in phantom lines as it is on the opposite side of the object and/or item 102 for ease of illustrating the operation thereof. The center point marking device 100 useful for locating the center 121 and marking precisely a center point 101 on various objects 102 configured with a geared carriage assembly 110 having guide holes 160, 170 for insertion of posts and a counterpunch centered automatically when posts are inserted into an interior and/or exterior surface of an object such as a square, rectangular, polygon, circle or other circular shapes. The center point marking device 100 may be used to quickly and accurately locate the center point 101 from a hole, aperture, and/or a prick mark 115 made in the surface of the object 102 such as, for example, paper, sheet metal, etc.

As illustrated in FIGS. 4-6, the operation of the center point marking device 100 may be used to position the object 102 between the point-recesses 133, 134 of the same dimension by operation of compressing the carriage assembly 110 to engage the point-recesses 133, 134 with the object 102 along the centerline 122 according to embodiments of the present invention. In this manner, the center point marking device 100 may locate the center point 101 of the object 102 that may be marked with a marker (e.g. pencil, pen, score, etc.) or marking tool e.g. the point of the tip 196 of the center punch assembly 195 upon striking the head 197 thereof for precision location. Similarly, the holes 161, 162 may be used to locate the center 121 of the object by inserting the posts 151 therein, positioning the object 102 between the posts 151 so as engage the object 102 along the centerline 122.

Referring to FIG. 4, according to an embodiment of the present invention, the center point marking device 100 may be used to find the center point quickly and accurately from any combination of inner and/or outer edges, surfaces, apertures 103, holes 104 and/or prick marks 105. For example, the carriage assemblies 110 are adapted to expand so as to place the guide holes 161, 162 adjacent first and second prick marks 105. A prick mark 105 is an indentation in the surface that receives the point of the post 151, 152, 153 inserted through guide holes 160 and 170 (e.g. individual guide holes 171-190. For example, the prick mark 105 on the surface is located and the post 151 is inserted through the guide hole 161 so as to have the point 155 located in the prick mark 105. Similarly, a second prick mark 105, spaced apart from the first prick mark 105 on the surface, is located and the post 151 is inserted through the guide hole 162 so as to have the point 155 located in the prick mark 105. After such arrangement of the center point marking device 100 to operably connect the posts 151 to the prick marks 105, whereby the user may locate and mark the center point 101. For example, when the center of the work has been located a marking tool including a pencil or the center punch assembly 195 may readily be depressed so that tip 196 on its lower end will strike the work surface by means of a hammer blow upon the head 197 on its projecting upper end so as to permanently record the center point 101 and location of the center 121 of the object 102 that is useful in further manufacturing and in industry as will be appreciated by one skilled in the field. As a result, the present invention overcomes limitations and disadvantages of conventional center point marking tools to advantageously provide marking between two prick marks, a prick mark 105 and either an aperture 103 or hole 104 so as to a locate the center point 101.

Referring to FIG. 5, according to an embodiment of the present invention, the center point marking device 100 may be used to find the center point 101 quickly and accurately from an aperture 103 and a hole 104. The carriage assemblies 110 are adapted to expand so as to place the guide holes 163, 164 adjacent the aperture 103 and hole 104 so as to receive the post 152 inserted through guide holes 163, 164. For example, the aperture 103 may be an oval/ellipse shape 109 and the hole a circular circle shape 108 formed the surface of the object, whereby post 152 is inserted through the guide hole 163 so as to have the tip located in the aperture 103 adjacent the surface thereof. Similarly, a second post 152 the surface is above the hole 104 and with the post 152 inserted through the guide hole 164 so as to locate the tip in hole 104. The carriage assemblies 110 may be compressed to force the post against the edge of the hole 104. An arm lock assembly 117 may be provided on one or more of the carriage assemblies 110 to lock the position of the arms 140, 145. After such arrangement of the center point marking device 100 to operably connect the posts 152 to the aperture 103 and hole 104, the user may mark the center point 101 by engaging the counterpunch 195 in a known manner. As a result, the present invention overcomes limitations and disadvantages of conventional center point marking tools to advantageously provide marking between an aperture 103 (e.g. ellipse, oval, circular shape, etc.) and hole 104 so as to a locate the center point 101.

Referring to FIG. 6, according to another embodiment of the present invention, the center point marking device 100 may be used to find the center point 101 quickly and accurately from combinations of multiple apertures 103, holes 104 and/or prick marks 105. For example, the center point marking device 100 may be used to locate the center point 101 using four holes 104*a*, 104*b*, 104*c* and 104*d* formed in the surface of the object 102. The carriage assemblies 110 are adapted to expand so as to place the guide holes 172, 173, 182, and 183 adjacent the holes 104*a*, 104*b*, 104*c* and 104*d* so as to receive the pin post 153 inserted through guide holes 172, 173, 182, and 183. For example, the holes 104*a*, 104*b*, 104*c* and 104*d* formed the surface of the object 102, whereby post 153 is inserted flat side 154, either flat surface 154 or point 155, through the guide hole 172 so as to have the tip located in the hole 104*c*, the guide hole 173 so as to have the tip located in the hole 104*a*, the guide hole 182 so as to have the tip located in the hole 104*d*, and the guide hole 172 so as to have the tip located in the hole 104*b* adjacent the surface thereof. The carriage assemblies 110 may be compressed to force the post against the edge surface of the guide holes 172, 173, 182, and 183. An arm lock assembly 117 may be provided on one or more of the carriage assemblies 110 to lock the position of the arms 140, 145. After such arrangement of the center point marking device 100 to operably connect the posts 153 to the guide holes 172, 173, 182, and 183, the user may mark the center point 101 by engaging the counterpunch 195, or other marking tool including a pencil, in a known manner.

According to another embodiment of center point marking device 100, by way of example shown in dashed-lines in FIG. 6, the center point marking device 100 may be used to locate the center point 101 using a surface of an aperture 103, a surface of a hole 104 and a prick mark 105, which are shown in by phantom lines in FIG. 6. It should be appreciated by one skilled in the art that the user may use numerous combinations of individual the post members 150 (e.g. large post 151, medium post 152, pin post 153) and utilize the flat surface 154 and/or pin point 155 to engage all edges and surfaces of the aperture 103, hole 104 and/or pin prick 105 to locate and mark the center point 101 of the object 102. As a result, the present invention overcomes limitations and disadvantages of conventional center point marking tools to advantageously provide marking between numerous combinations of apertures 103, holes 104 and prick marks 105, for example, an aperture 103 (e.g. ellipse, oval, circular shape, etc.), hole 104 and a prick mark 105*a*, and/or multiple hole 104*a*, 104*b*, 104*c*, and 104*d* so as to a locate the center point 101.

While certain configurations of structures have been illustrated for the purposes of presenting the basic structures of the present invention, one of ordinary skill in the art will appreciate that other variations are possible which would still fall within the scope of the appended claims. Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A center locating device comprising a pair of carriage assemblies, each carriage assembly configured in a general block shape with an extension on a bottom block portion relative to an upper block portion, the bottom block portion adapted to be positioned upon an object, each carriage assembly configured with an arm shaft opening formed therein adjacent said extension, and a plurality of guide holes formed between the upper and lower block portions therethrough and substantially orthogonal to an object for locating the center thereof;

at least one post member for each carriage assembly, said post member dimensioned to be slideably received in said plurality of guide holes formed in said carriage assembly, said post member configured with a point on an end thereof;

a gear assembly, said gear assembly configured with an upper and lower flange portion and a central hub; and a pair of arms comprising an elongated member having ends and a gear toothed surface portion, each arm configured for securing one end in one of said arm shaft opening, and a free end of said elongated member slidably mounted within said arm shaft opening so as to extend beyond said carriage assembly, said arm configured with said rack gear for operably interconnecting said gear to said gear toothed surface portion of said elongated members for simultaneous movement of said free end of said arm through said arm shaft opening to extend beyond said carriage assembly, whereby said gear defining a center point for any given position of said arm relative to said carriage assembly, said center point in alignment with the central axis of a bore of said gear and configured to maintain alignment as being movably mounted for free movement by said free end of said arm relative said carriage assembly.

2. The device of claim 1, wherein said carriage assembly further comprises an arm locking means for locking said arm in said arm shaft opening as desired.

3. The device of claim 2, wherein said carriage assembly further comprises a stop means on said free end of said arm for maintaining slidable relationship between said arm and said arm shaft opening of said carriage assembly.

* * * * *